Figure 1:
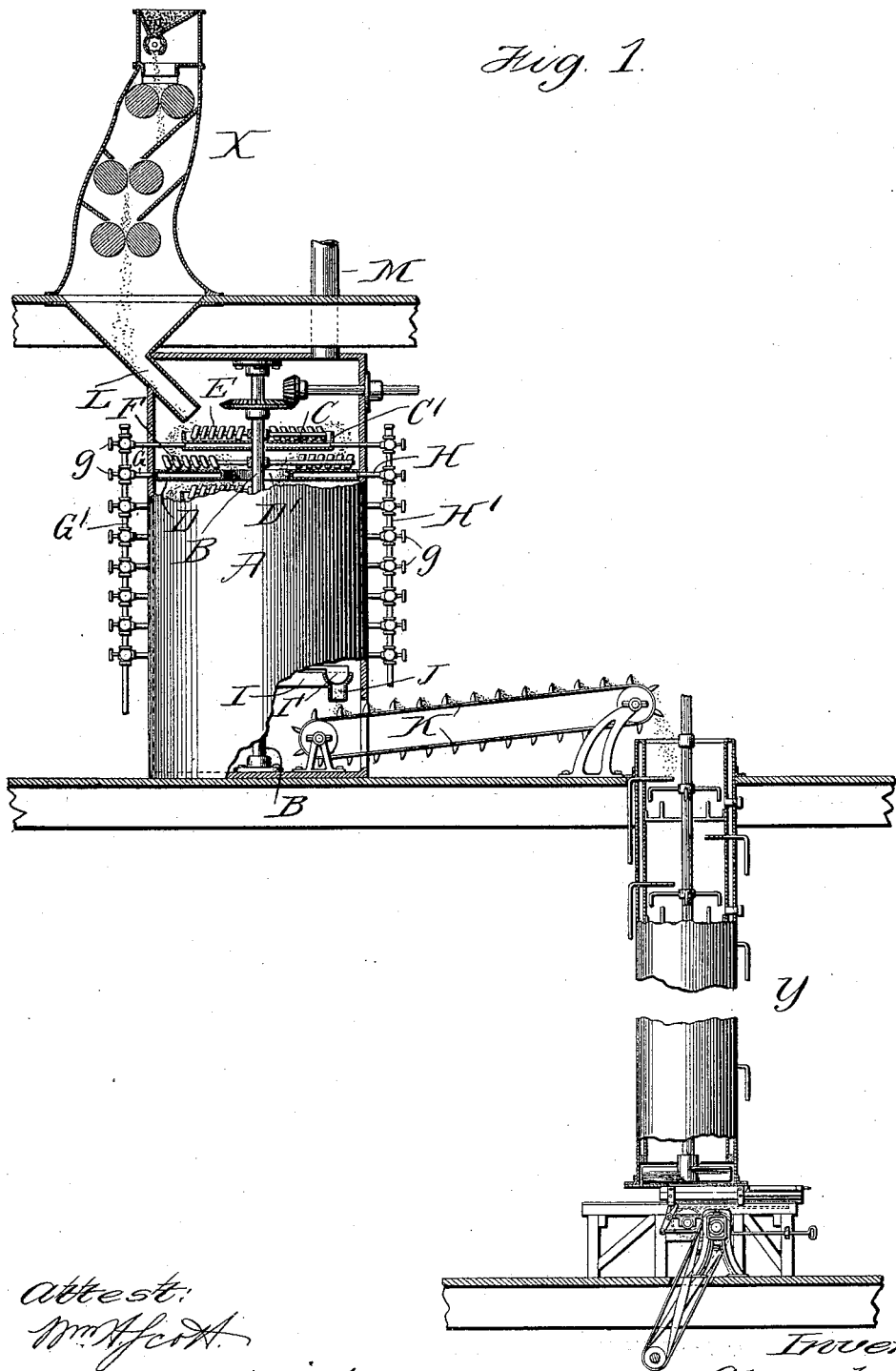

No. 616,228. Patented Dec. 20, 1898.
A. EUSTON.
PROCESS OF EXTRACTING OIL FROM SEEDS.
(Application filed Aug. 16, 1897.)
(No Model.) 2 Sheets—Sheet 1.

Attest:
Wm. H. Scott
Ralph Walsh

Inventor:
Alexander Euston
by Bakewell & Cornwall
Attys.

THE NORRIS PETERS CO., PHOTO-LITHO., WASHINGTON, D. C.

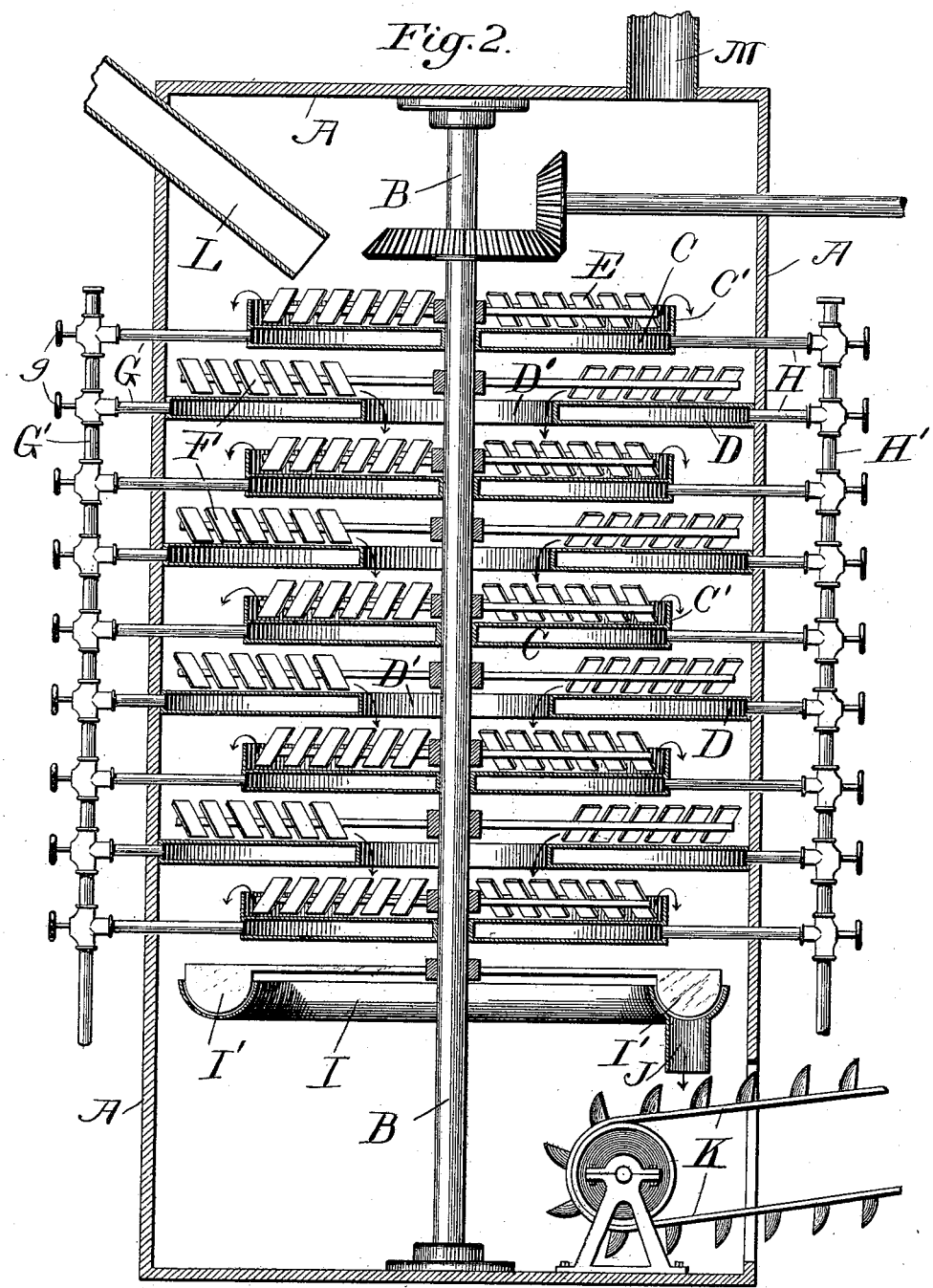

UNITED STATES PATENT OFFICE.

ALEXANDER EUSTON, OF ST. LOUIS, MISSOURI.

PROCESS OF EXTRACTING OIL FROM SEEDS.

SPECIFICATION forming part of Letters Patent No. 616,228, dated December 20, 1898.

Application filed August 16, 1897. Serial No. 648,403. (No specimens.)

*To all whom it may concern:*

Be it known that I, ALEXANDER EUSTON, a citizen of the United States, residing at the city of St. Louis, State of Missouri, have invented a certain new and useful Improvement in Methods of Treating Oleaginous Seeds, of which the following is a full, clear, and exact description, such as will enable others skilled in the art to which it appertains to make and use the same, reference being had to the accompanying drawings, forming part of this specification, in which—

Figure 1 is a diagrammatic view illustrating the method of treating oleaginous seeds, in which is included apparatus for effecting the step in my improved method. Fig. 2 illustrates a vertical sectional view of a machine employed for carrying out the step in the treatment of oleaginous seeds to which my invention particularly relates.

This invention relates to the treatment of oleaginous seeds for the production of oil and oil-cake, (especially linseed-oil and linseed-cake,) and more particularly to that step in the treatment of oleaginous seeds whereby the seeds are dried to a uniform degree of dryness after they are ground and before they are placed in the tempering-kettle.

Heretofore flaxseed (linseed) has been treated and prepared for tempering either by being passed through a single pair of horizontal rolls and then crushed under muller or edge stones, the two being used together and constituting a single process of preparation, or the seed has been crushed by means of a set of heavy rolls superimposed one upon the other, so that the last action of the rolls on the seed subjects the seed to a pressure equivalent to the weight of the four rolls above.

Cotton-seed after having the cotton removed by special machinery for that purpose has been treated before tempering in substantially the same manner as linseed.

The muller or edge stones to which I have referred have usually weighed from four to ten thousand pounds and the rolls described from fifteen to twenty-five hundred pounds each.

In the practice of any of these methods it has been found from experience that the seed from different parts of the country or from different climates have more or less moisture in their composition, depending upon the climate of the part of the country from which they were taken or upon the atmospheric conditions through which they passed in transportation. It frequently happens that seed in a very moist state are fed into the crushing machinery, and another batch immediately following in a very dry state is fed to the same crushing machinery, and as one tempering-kettle is usually employed for several crushing-machines constant attention has to be given to the tempering-kettle in order to have the seed uniformly tempered. This necessitates the attention of a skilled workman, who determines the condition of the seed being tempered by taking a handful of crushed seed or meal from the tempering-kettle and ascertaining its state. If the meal is too dry, more steam or moisture is admitted into the tempering-kettle. If the meal is already moist, less steam or moisture is introduced into the tempering-kettle. From the above it will be noted that this absence of uniformity in tempering renders the percentage of oil and other qualities of the resultant oil-cake uncertain and irregular. For instance, a batch of very dry seed immediately following a batch of very moist seed might escape the attention of the workman in charge of the tempering-kettle and so pass to the press in a very dry state. Some manufacturers in order to overcome this irregularity in the percentage of moisture contained in different batches of seed have attempted to remedy the same by drying the whole or unground seed before they were introduced into the crushing machinery. This has proved impracticable, for the reason that each seed is inclosed by a hard shell or skin which is, for all intents and purposes, impervious during the short time the seed are subjected to the preparatory drying process, and though the seed be extremely moist the moisture will be retained therein by this skin or shell, the only result accomplished in this preparatory drying being the evaporation of the moisture from the outside of the skin or shell, which moisture in itself forms such a small percentage as to be practically harmless.

My present invention relates to a method of treating oleaginous seeds after they are crushed when their meal contents are exposed and before they are subjected to treatment in the tempering-kettle, the object being to uniformly dry the meal contents of the seed, so that when the seed are placed in the tempering-kettle irrespective of their condition when crushed they are uniformly dry, the seed requiring little or no attention while being tempered in the tempering-kettle.

In the drawings I have shown an apparatus by which my improved process can be carried out; but I do not wish to be understood as limiting the practice of my process thereto, as other forms of apparatus can be employed with success—such, for instance, as many well-known and common forms of driers on the market to-day.

In the apparatus shown, A indicates a suitable casing, and B a central shaft.

C indicates a series of stationary drying-pans of less diameter than the casing A and provided with a flange C' at their outer edges.

D indicates a series of drying-pans alternating with the pans C, said pans D being of the same diameter as the casing A and formed with a central aperture D'.

E indicates a series of agitators or plows mounted on shaft B and operating above the pans C, said plows acting on the ground seed or meal in the pans C to move the same outwardly and over the flange C', when the ground seed or meal falls onto the pan D below.

F indicates a series of agitators or plows operating on the pans D to move the ground seed or meal inwardly toward the central aperture D', where it drops onto the next pan C below. This operation is continued throughout the series of pans.

Each drying-pan preferably consists of a steam-chest, into which suitable pipes G lead from a common supply-pipe G', each of the steam-pipes G being individually controlled by a valve $g$, the water of condensation from the drying-pans being conducted off through pipes H, leading to a common exhaust-pipe H'. After the ground seed or meal has been dried it is delivered into a circular trough I, located near the bottom of the casing A, in which trough sweeps I' carry the ground seed or meal until it falls through a spout J onto a conveyer-belt K, whence they are delivered into the tempering-kettle. The ground seed or meal is delivered from the crushing machinery onto the upper drying-pan through a suitable spout L. A pipe M preferably leads from the top of the casing A to a fan which exhausts the moisture-laden air.

From the above it will be seen that my invention relates particularly to the treatment of ground seed or meal after crushing and before introduced into the tempering-kettle. Should a batch of dry seed be passed through the crushing machinery immediately after a batch of moist seed is passed therethrough, the meal from the dry seed will be passed through the drying apparatus the same as the meal from the moist seed, and as the drying-pans tend to evaporate the moisture in the moist ground seed or meal said evaporated moisture will be drawn upwardly and out through the exhaust-pipe M. The dry ground seed or meal being introduced at the top will be in the path of this moisture-laden air, and as the meal contents of the seed have an affinity for moisture the dry meal will collect a certain amount of moisture from the moist meal, but no more than is permitted by the temperature of the drying-pans. Thus the different batches of seeds are made uniform before being delivered to the moistening apparatus. The meal thus treated has a uniform degree of dryness or moisture. Speaking of moisture, I mean that which is inherent in the seeds and cannot be gotten rid of except by subjecting the seeds for a considerable time to a high heat, and when introduced into the tempering-kettle requires little or no attention in the matter of regulating the steam-supply to said tempering-kettle. In other words, the valve in the tempering-kettle can be set to admit a certain amount of steam or moisture, which will answer for all the meal after being treated in the manner above set forth, irrespective of whether the seed when crushed be extremely dry or moist.

In the diagrammatic view, Fig. 1, I have shown the relation of the apparatus used for carrying my improved step in the process of preparing oleaginous seeds to other and well-known apparatus. In the view, X indicates the crushing-mill, such as is shown in my former application for patent filed June 23, 1897, serially numbered 641,881, which has now gone to patent, being No. 594,390, dated November 30, 1897. The seed are first run through this machine, after which they are delivered into the top of the apparatus illustrated in detail in Fig. 2 through spout L, which apparatus, as before stated, carries out my improved step in the process of treating the seeds. After being treated in this apparatus the seeds are taken by suitable means, a belt K being shown, to a tempering-kettle Y, where they are heated and tempered, meanwhile being subjected to the action of steam, as described in Patent No. 587,802, granted to me August 10, 1897. After being treated in the tempering-kettle the seeds are then formed into cakes, which temporarily gives them shape, so that they may be readily handled, after which they are placed in the press and the oil extracted therefrom.

Having thus described my invention, what I claim, and desire to secure by Letters Patent, is—

The process herein described of treating oleaginous seeds preparatory to extracting the oil therefrom, the same consisting in first crushing the seeds, then drying the seeds, and finally moistening the seeds, substantially as described.

In testimony whereof I hereunto affix my signature, in the presence of two witnesses, this 12th day of August, 1897.

ALEXANDER EUSTON.

Witnesses:
  F. GROEMOH,
  A. H. RUGG.